United States Patent
Schultz et al.

(10) Patent No.: US 9,106,749 B2
(45) Date of Patent: Aug. 11, 2015

(54) VIRTUAL CALL CENTER MANAGER

(75) Inventors: Paul T. Schultz, Colorado Springs, CO (US); Robert A. Sartini, Colorado Springs, CO (US); Martin W. McKee, Herndon, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1330 days.

(21) Appl. No.: 12/398,441

(22) Filed: Mar. 5, 2009

(65) Prior Publication Data

US 2010/0226490 A1    Sep. 9, 2010

(51) Int. Cl.
  *H04M 3/00*    (2006.01)
  *H04M 5/00*    (2006.01)
  *H04M 3/523*    (2006.01)
  *H04M 3/51*    (2006.01)

(52) U.S. Cl.
  CPC .......... *H04M 3/5233* (2013.01); *H04M 3/5183* (2013.01); *H04M 3/523* (2013.01); *H04M 3/5232* (2013.01)

(58) Field of Classification Search
  CPC . H04M 3/5183; H04M 3/523; H04M 3/5232; H04M 3/5233
  USPC .......................................... 379/265.01–265.14
  See application file for complete search history.

(56) References Cited

U.S. PATENT DOCUMENTS

| | | | | |
|---|---|---|---|---|
| 6,934,379 | B2 * | 8/2005 | Falcon et al. | 379/265.02 |
| 6,978,006 | B1 * | 12/2005 | Polcyn | 379/265.12 |
| 7,801,111 | B2 * | 9/2010 | Coussement | 379/265.05 |
| 7,913,063 | B1 * | 3/2011 | Lyerly | 379/265.12 |
| 2003/0198337 | A1 * | 10/2003 | Lenard | 379/265.14 |
| 2004/0096050 | A1 * | 5/2004 | Das et al. | 379/265.12 |
| 2005/0195960 | A1 * | 9/2005 | Shaffer et al. | 379/265.02 |
| 2006/0062373 | A1 * | 3/2006 | Chervets et al. | 379/265.03 |
| 2007/0172050 | A1 * | 7/2007 | Weinstein et al. | 379/266.07 |
| 2009/0125608 | A1 * | 5/2009 | Werth et al. | 709/218 |
| 2011/0213860 | A1 * | 9/2011 | Ezerzer et al. | 709/218 |

* cited by examiner

*Primary Examiner* — Nafiz E Hoque

(57) ABSTRACT

An approach is provided for providing a virtual call center by receiving a request for service from a user (e.g., subscriber) and staffing the virtual call center with virtual agents selected based on the service requirements of the user and the rich presence information of the virtual agents. The rich presence information includes a skill set of the virtual agent, presence status of the virtual agent, location of the virtual agent, calendar information of the virtual agent, communication capability of the virtual agent, mobility of the virtual agent, or a combination thereof.

14 Claims, 10 Drawing Sheets

VIRTUAL CALL CENTER MANAGER

BACKGROUND INFORMATION

Many businesses are finding it an ever growing challenge to provide responsive customer support and service in a cost effective manner. This challenge is even greater when a business faces spikes in demand for its services. For example, a business may face spikes in demand for customer support or services at specific times of the year (e.g., a florist may see a spike in orders on Valentine's Day or a retailer may see increased demand during the holidays). In other cases, a business might see a spike in customer support requests when new products or services are introduced. At other times, these spikes may occur unexpectedly. For instance, a television provider may experience a spike in repair requests in the aftermath of a sudden storm that disrupts television service. These spikes can easily overwhelm the capacity for the business' own staff to respond. In many cases, a business has to balance the cost of maintaining a certain level of support staff against anticipated customer demand. Traditionally, when faced with this situation, a business can contract for additional customer support agents in third-party call centers to meet the demand. However, the traditional process for initiating the use of such a call center is often expensive, complex, and time consuming. In the meantime, any delay by the business in responding to increased customer demand can lead to dissatisfied customers, increased complaints, or even lost business.

In parallel, communications service providers are continually challenged to develop new services and features to remain competitive and to develop new sources of revenue.

Therefore, there is a need for an approach that provides for rapid and efficient establishment of a call center to assist an organization in responding to the needs of its customers, while creating a new source of revenue for communication service providers.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and system for providing a virtual call center are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

As used herein, the term "virtual call center" is a service that enables an organization (e.g., a business, a university, a charity) to access staff (e.g., a "virtual staff group") as needed, for instance, to support the organization's operations (e.g., customer support, on-site service, sales, etc.). Similarly, a "virtual staff group," as use herein, refers to the set of staff members associated with the virtual call center that perform the services requested of the virtual call center, and a "virtual agent" is an individual member of the "virtual staff group." Although various exemplary embodiments are described with respect to a virtual call center operated by a third party relative to the organization, it is contemplated that the virtual call center may be operated by the organization itself, a third party, other parties, or any combination thereof. Additionally, the virtual agents of the virtual staff group may be located on-site, off-site, or a combination thereof.

Figure 1:
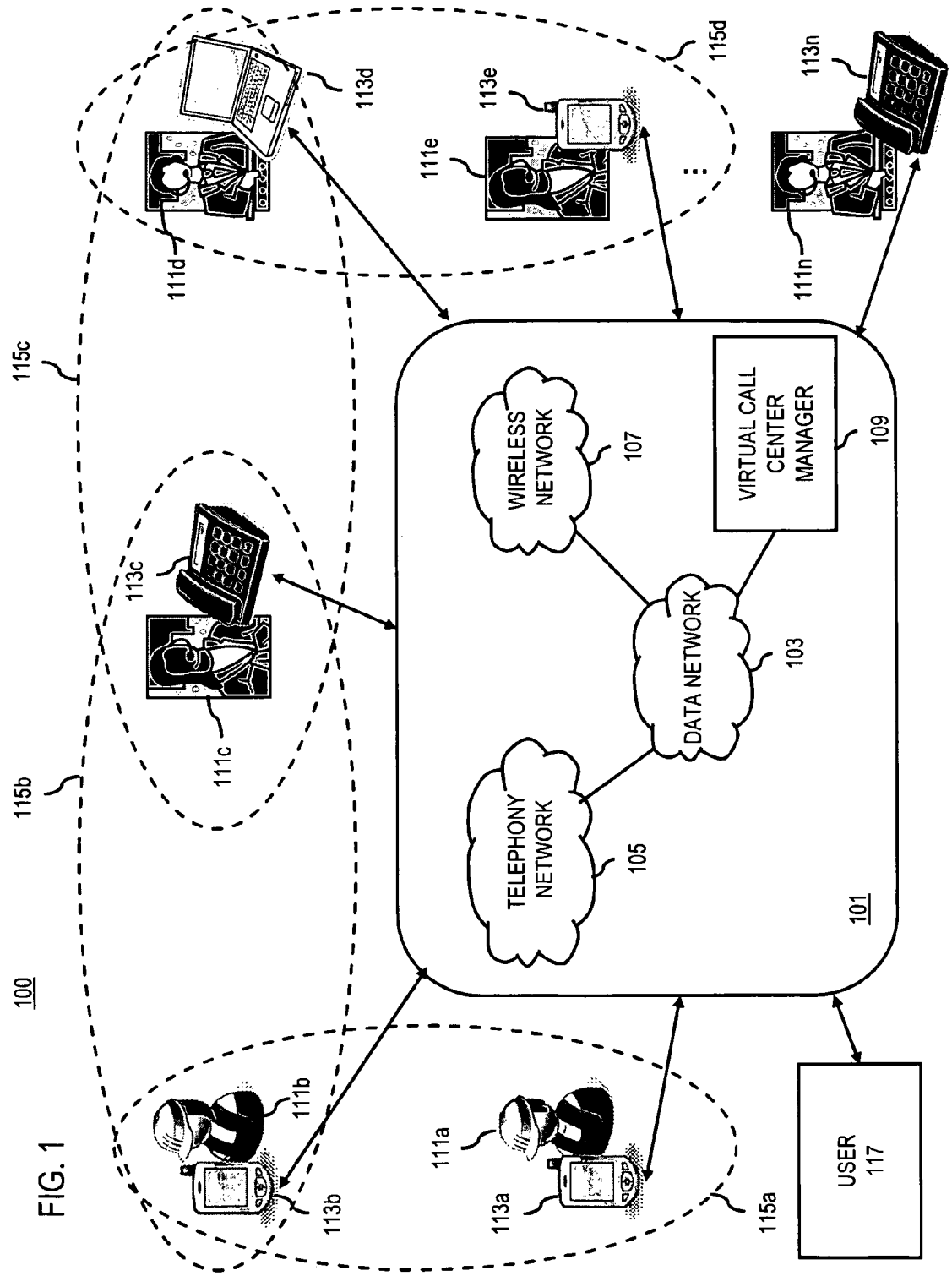
FIG. 1 is a diagram of a system capable of providing a virtual call center, according to an exemplary embodiment.

FIG. 1 is a diagram of a system capable of providing a virtual call center, according to an exemplary embodiment. For the purposes of illustration, a virtual call center can be formed with agents distributed across communication system 100, wherein such agents can utilize various forms of communication devices and technologies to create groups for addressing service requirements. In this example, the system 100 includes a communication network 101 including a data network 103, telephony network 105, and wireless networks 107. It is contemplated that the data network 103 may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. The telephony network 105 may include a public switched telephone network (PSTN) or equivalent. It is also contemplated that the wireless network 107 may be, for example, a cellular network and may employ various technologies including, for example, code division multiple access (CDMA), enhanced data rates for global evolution (EDGE), general packet radio service (GPRS), global system for mobile communications (GSM), universal mobile telecommunications system (UMTS), etc., as well as any other suitable wireless medium, e.g., microwave access (WiMAX), Long Term Evolution (LTE) networks, wireless fidelity (WiFi), satellite, and the like. Communication network 101 may include session control capabilities such as those provided by the Internet protocol multimedia subsystem (IMS). The communication network 101 supports a variety of communications sessions (e.g., voice, video, text messaging, electronic mail (E-mail), instant messaging, etc.) conducted on any device capable of communicating over the network 101.

Within the system 100, a virtual call center manager 109 provides the capability to dynamically provide a virtual call center over a communication network 101 on behalf of a user 117. The user 117 also has connectivity to the network 101 and is, for example, any organization requiring the services of the virtual call center manager 109. In addition, the system 100 includes multiple virtual agents 111 organized into one or more virtual staff groups 115. In an exemplary embodiment, the virtual call center manager 109 is resident within the communication network 101. In addition (or alternatively), the virtual call center manager 109 resides within customer premises equipment (CPE). In operation, the virtual call center manager 109 receives a request for service from a user 117, determines one or more service requirements based on the request, and selects one or more virtual staff group 115 or agents 111 to service the request based on the service requirements of user 117 and the rich presence information associated with the virtual staff group 115 or agents 111. By way of example, the rich presence information includes a skill set of the virtual staff group 115 or agent 111, presence status of the virtual staff group 115 or agent 111, location of the virtual staff group 115 or agent 111, calendar information of the virtual staff group 115 or agent 111, communication capability of the virtual agent staff group 115 or agent 111, mobility of the virtual staff group 115 or agent 111. In this way, the virtual call center manager 109 can select and provide virtual staff groups 115 and agents 111 to meet the client 117's specific service requirements.

As discussed previously, organizations (e.g., user 117) at times require additional staff to assist in responding to customer needs. Traditionally, these organizations have outsourced their customer support and service needs to third party call centers using expensive specific purpose systems such as Automatic Call Distribution (ACD) and Computer Telephony Integration (CTI) systems. Moreover, implementing and configuring these traditional systems can be complex and time-consuming. The virtual call center manager 109 addressees these problems by leveraging, in exemplary embodiments, generally available communication systems, protocols, and devices to reduce the cost, complexity, and time necessary to establish a virtual call center dynamically tailored to the user 117's specific requirements using rich presence information.

As seen in FIG. 1, the virtual call center manager 109 has connectivity to multiple virtual agents 111a-111n and one or more users (e.g., user 117) via communication devices 113a-113n, respectively, and the communication network 101. In an exemplary embodiment, each virtual agent 111 is associated with rich presence information describing one or more characteristics of the virtual agent 111. For instance, these characteristics include, but are not limited to: (1) a skill set of the virtual agent 111, (2) the presence status of the virtual agent 111, (3) location of the virtual agent 111, (4) calendar information of the virtual agent 111, (5) communication capability of the virtual agent 111, and (6) mobility of the virtual agent 111. The characteristics are more fully described with respect to FIG. 3.

Certain embodiments further organize the virtual agents 111 into one or more virtual staff groups 115 according to, for instance, the rich presence information of the virtual agents 111. For example, a virtual staff group 115a includes virtual agents 111a and 111b who have high mobility and experience with field repairs to provide on-site repair service on behalf of a user 117 who is a television service provider (e.g., Verizon FiOS Home Support). Similarly, the virtual agents 111b and 111c comprise a virtual staff group 115b to, for instance, support operation of a bank's network of automated teller machines (ATMs); the virtual agents 111c and 111d comprise a virtual staff group 115c with retail experience to provide support to an online retailer; and the virtual agents 111d and 111e comprise a virtual staff group 115d to provide business-to-business customer support. As shown, it is contemplated that a virtual agent 111 can be a member of multiple virtual staff groups 115 based on the agent's rich presence information (e.g., virtual agent 111b is a member of both virtual staff group 115a and 115b, virtual agent 111c is a member of both virtual staff group 115b and 115c, and virtual agent 111d is a member of both virtual staff group 115c and 115d.

As discussed, each virtual agent 111 is connected to the communication network 101 through a communication device 113. In exemplary embodiments, the communication device 113 is any fixed terminal, mobile terminal, or portable terminal capable of communication over the communication network 101. Examples of the communication device include a mobile smart phone, a mobile feature phone, a phone connected to a Public Switched Telephone Network (PSTN), a personal digital assistant (PDA), a personal computer (PC), as well as other like technologies and customer premises equipment (CPE).

In one embodiment, the virtual call center service is a managed service, whereby a service provider operates the virtual call center manager 109 to serve one or more users (i.e., subscribers) 117.

Figure 2:
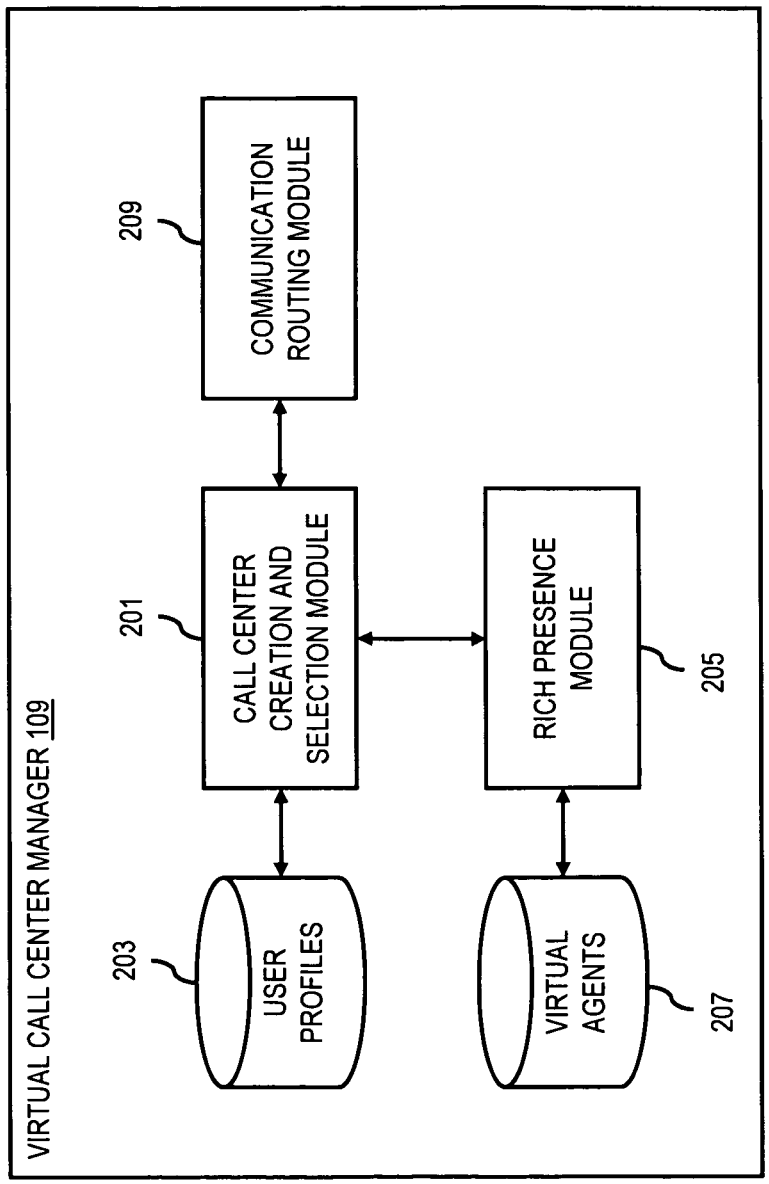
FIG. 2 is a diagram of the components of virtual call center manager, according to an exemplary embodiment.

FIG. 2 is a diagram of the components of virtual call center manager, according to an exemplary embodiment. By way of example, the virtual call center manager 109 includes one or more modules for providing a virtual call center. In this embodiment, the virtual call center manager 109 includes a call center creation and selection module 201 to receive and process service requests form a user 117 and communications from customers of the user 117. More specifically, the module 201, for example, is configured to operate in at least two modes. In a first mode, the module 201 is configured to respond to an initial request from a user 117 for service. In a second mode, the module 201 is configured to process communications from the customers of a user 117 that has already established a virtual call center.

In the first mode, the module 201 receives an initial request from a user 117 to provide a virtual call center. The request from the user 117 may include specific requirements for various characteristics of a requested virtual staff group 115 or agents 111 (e.g., skill set, location, mobility, etc.). These characteristics, for instance, are defined in the rich presence information associated with a virtual staff group 115 or virtual agent 111. On receiving the request, the module 201 processes the request to determine specific service requirements. The module 201 then selects a virtual staff group 115 and/or agents 111 from the set of virtual staff groups 115 and agents 111 available to the virtual call center manager 109 by evaluating the rich presence information associated with each virtual staff group 115 or agent 111 against the determined service requirements.

By way of example, the module 201 has connectivity to a database 203 of user profiles and a rich presence module 205 to assist in making the selection. In exemplary embodiments, the user profile database 203 contains information on the history of service requests from the user 117, if any, and the virtual staff groups 115 and/or agents 111 selected to service those prior requests. In certain embodiments, the module 201 uses the historical information in the user profile database 203 to assist in the selection of the virtual staff group 115 or agents 111. In addition, the module 201 can store a record of a new selection of a virtual staff group 115 in the database 203. In addition or alternatively, the historical information can be stored as part of the rich presence information associated with a virtual staff group 115 and agent 111. Rich presence module 205 and user profiles database 203 may leverage shared infrastructure modules within communications network 101 such as those provided by the Internet protocol multimedia subsystem (IMS) Presence Server and Home Subscriber Server (HSS) respectively.

To select a virtual staff group 115 or agent 111, the module 201 also has connectivity to a rich presence module 205 to access rich presence information associated with the set of virtual staff group 115 and agents 111 available to the virtual call center manager 109. In exemplary embodiments, the rich presence module 205 may include a rich presence server to collect, store, and distribute the rich presence information. By way of example, the rich presence information can originate from any number of sources (e.g., direct input from each virtual agent 111; direct input from a designated administrator; telemetry data from equipment associated with each virtual agent such as location information from a location-aware mobile handset; information from other servers). The rich presence server updates the rich presence information periodically to provide the rich module 205 with the most current data.

The rich presence module 205 also has connectivity to a database 207 of virtual agents 111. The virtual agents database 207 includes a listing of the agents 111 and their associated rich presence information. An exemplary data structure that the database 207 can use is described with respect to FIG. 3. In certain embodiments, each virtual agent 111 may update his or her own rich presence information via the rich presence module 205 through both manual and automated processes (e.g., change status from "on phone" to "available" automatically after completing a phone call, change location using location information from a location-aware mobile handset). It is also contemplated that the rich presence information may be updated by one or more other designated parties.

In the second mode of operation in which a virtual call center has already been created for the user 117, the call center creation and selection module 201 receives communications from customers of the user 117. The module 201 then interacts with the rich presence module 205 to select the appropriate virtual staff group 115 or virtual agent 111 to handle the customer communication. Next, the module 201 interacts with the communication routing module 209 to route the communication to the appropriate virtual agent 111. In exemplary embodiments, the functions of the communication routing module 209 may be performed by, for instance, an Internet protocol multimedia subsystem (IMS). An IMS enables the routing and session control of a variety of media sessions (e.g., voice, video, instant messaging) among devices connected via, for instance, a data network.

In exemplary embodiments, the components of the virtual call center manager 109 (e.g., call center creation and selection module 201 and communication routing module 209) communicate rich presence information using, for instance, standard presence protocols (e.g., Session Initiation Protocol for Instant Messaging and Presence Leveraging Extensions (SIMPLE) and Extensible Messaging and Presence Protocol (XMPP)). SIMPLE and XMPP are examples of presence protocols that provide real-time or near real-time presence information. Specifically, SIMPLE uses the Session Initiation Protocol (SIP) to register, manage, transmit, and receive presence information. XMPP provides similar capabilities using an open standard. Both protocols are extensible standards, which enables the incorporation of the rich presence information described herein through the additional information elements within the standard protocols.

Figure 3:
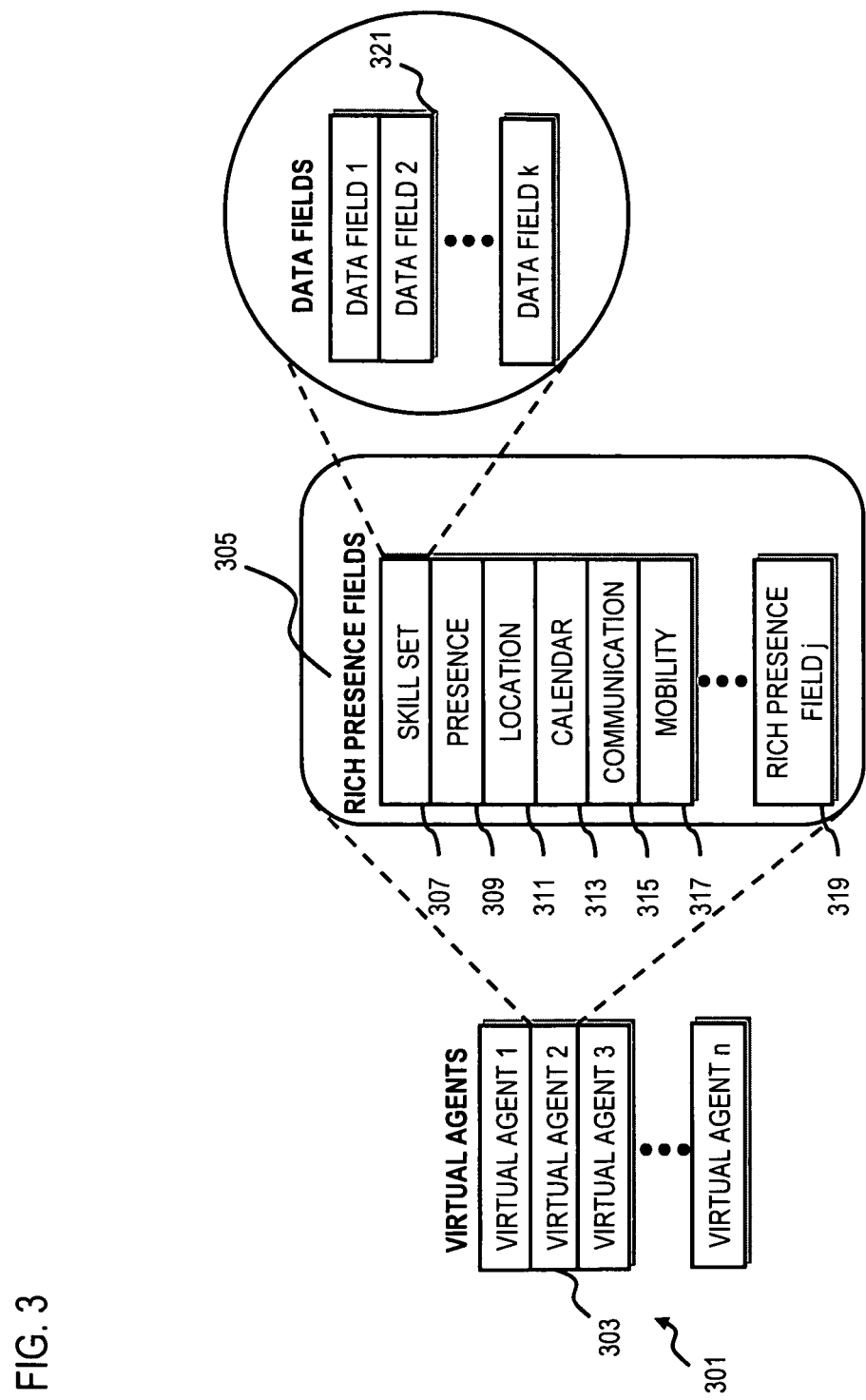
FIG. 3 is a diagram of a data structure that can be used by the database of virtual agents of FIG. 2, according to an exemplary embodiment.

FIG. 3 is a diagram of a data structure that can be used by the database of virtual agents of FIG. 2, according to an exemplary embodiment. As in typical database management systems, data can be stored in one or more data containers, each container contains records, and the data within each record is organized into one or more fields. As shown in FIG. 3, a data container 301 of virtual agents records 303 is used to store, for instance, the rich presence information and is correlated from 1 to n (n being an integer) to each virtual agent record 303. The rich presence information (i.e., rich presence fields 305) associated each virtual agent record 303 includes a skill set 307, presence 309, location 311, calendar 313, communication 315, and mobility 317. It is contemplated that additional rich presence fields (e.g., rich presence field j 319) may be added. Further, each rich presence field 305 may be broken down in to data fields 321. In this regard, the number k of data fields 321 for each rich presence field 305 is dependent upon the level of detail desired.

In an exemplary embodiment, the skill set 307 of a virtual agent 111 includes information such as the technical capabilities of the virtual agent 111, language skills of the virtual agent 111, knowledge base, areas of expertise, and/or experience with specific users 117 or customers of the users 117. The presence status 309 of the virtual agent 111 indicates information such as the agent 111's availability and other similar information (e.g., available to accept new requests, with a customer, on break, away from desk, etc.). The location 311 of the virtual agent 111 indicates the agent's physical location. For example, the location 311 rich presence information enables the virtual call center manager 109 to select virtual agents 111 who are located near a particular site to provide timely onsite service. The calendar information 313 of the virtual agent 111 provides information on upcoming appointments, scheduled absences, work schedule, etc. By leveraging calendar information 313, the virtual call center manager 109 can assess a virtual agent 111's future availability in addition to the current availability of the agent 111. The communication capability 315 of the virtual agent 111 indicates the type of communication session (e.g., voice, video, instant messaging, chat, E-mail) in which the agent 111 can engage. This capability, for instance, is dictated at least in part by the type of communication device 113 that the virtual agent 111 is using and assists the virtual call center manager 109 in determining the types of communication sessions the agent 111 can support. Finally, the mobility 317 of the virtual agent 111 indicates whether the agent 111 can travel to a different location (e.g., to provide onsite support). It is contemplated that exemplary embodiments may add, delete, or substitute any of the described characteristics. One or more of the characteristics in any combination comprise the rich presence information of the virtual agent 111.

Figure 4:
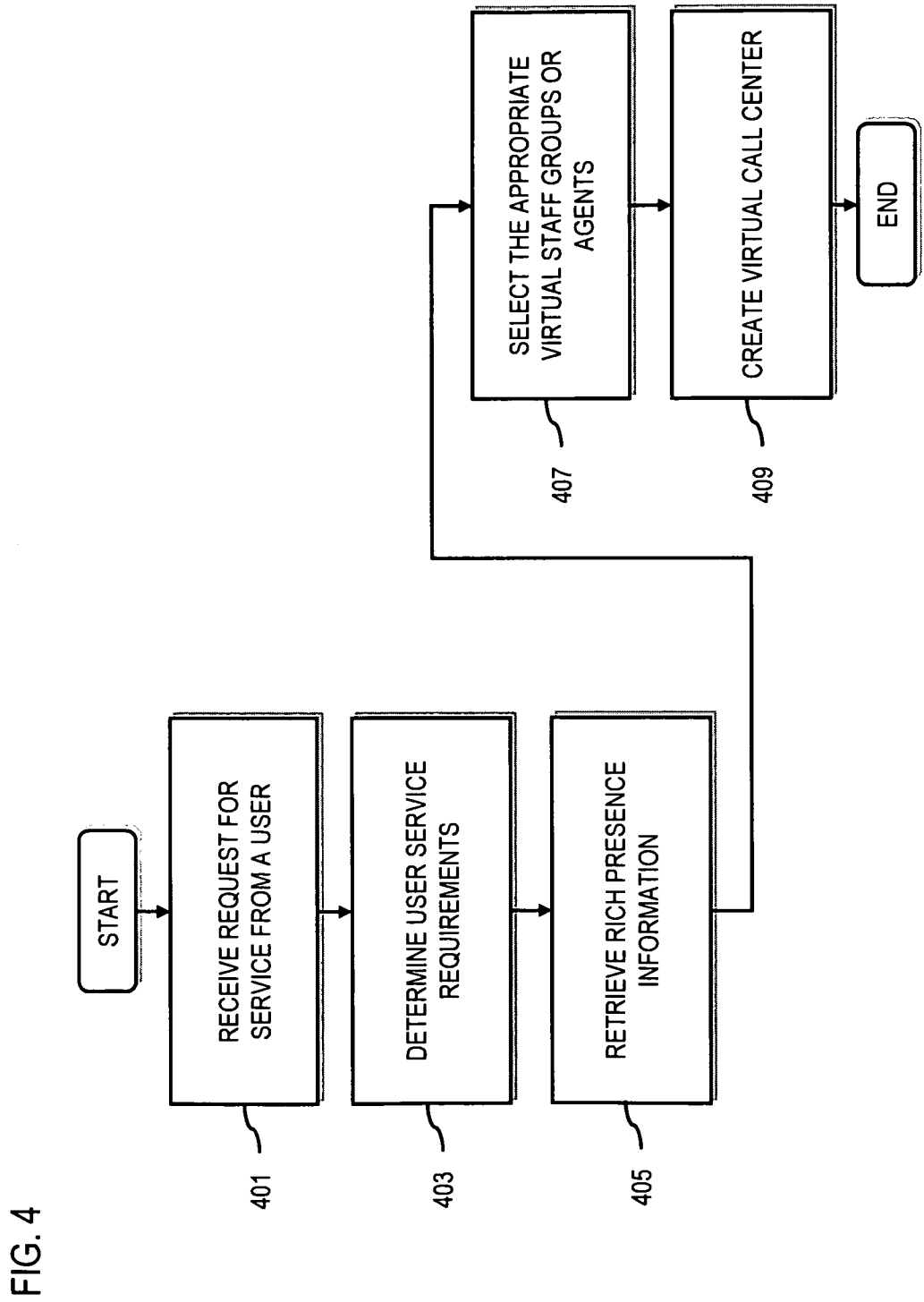
FIG. 4 is a flowchart of a process for providing a virtual call center, according to an exemplary embodiment.

FIG. 4 is a flowchart of a process for providing a virtual call center, according to an exemplary embodiment. In step 401, the virtual call center manager 109 receives an initial request from a user 117 to establish a virtual call center to, for instance, provide service to customers on behalf of the user 117. This request initiates the process for setting up the virtual call center and preparing it to receive customer communications. In this example, the request may include information such as level of staffing needed, type of functions to be performed, time period for operation, and other similar information. From the information in the request, the virtual call center manager 109 determines a set of service requirements (e.g., user 117-specific skills, optimal communication device capability, and mobility) (step 403). The virtual call center manager 109 then retrieves the rich presence information associated with the virtual staff groups 115 and agents 111 that may potentially staff the request (step 405).

In certain embodiments, the virtual call center manager 109 may pre-select one or more virtual staff groups 115 of virtual agents 111 to quickly respond to user 117 requests using the process described below. In other embodiments, the virtual call center manager 109 selects the virtual staff group 115 and/or agents 111 at the time a communication from a customer of the user 117 is received by the virtual call center manager 109. Accordingly, the virtual call center manager 109 may retrieve the rich presence information associated with a potential virtual staff group 115 as a whole, the rich presence information associated with individual virtual agents 111, or both. In the next step, the virtual call center manager 109 evaluates the retrieved rich presence information against the determined service requirements of the user 117 to select which virtual staff groups 115 and agents 111 can service the request (step 407). For example, to service a request from an online florist, the virtual call center manager 109 selects virtual agents 111 whose rich presence information indicates floral retail experience and assigns them to a virtual staff group 115 designated to service the online florist. The virtual call center manager 109 may also designate multiple virtual staff groups 115 to service a request for multiple virtual staff group 115 if more than one virtual staff group 115 meet the service requirements. For example, in the online florist of the above example, the virtual call center manager 109 may designate a second virtual staff group 115 of virtual agents 111 with general retail experience. In exemplary embodiments, the virtual agents 111 within a virtual staff group 115 share one or more characteristics as defined in the rich presence information.

In certain embodiments, the virtual call center manager 109 may use a "sticky virtual staff group" approach. Under this approach, the virtual call center manager 109 designates the same virtual staff group 115 to service similar service requests from the same user 117. In this way, the virtual call center manager 109 can leverage the experience a virtual staff group 115 has with a particular user 117. Experience with the user 117 can be included with the rich presence information associated with a virtual staff group 115 or agent 111.

After selecting one or more virtual staff group 115 for the user 117, the virtual call center manager 109 creates a virtual call center (step 407). In exemplary embodiments, the step of creating the virtual call center may include allocating the virtual agents 111 with the virtual staff group 115 to the task and dedicating communication links for the user 117's customers.

It is also contemplated that, in certain embodiments, the virtual call center manager 109 does not select a virtual staff group 115 at the time a virtual call center is established. As discussed previously, the virtual call center manager 109 instead dynamically selects a virtual staff group 115 or agent 111 when it receives a request to establish a communication session with a customer of the user 117 on behalf of the user 117. Under this approach, the virtual call center manager 109, for instance, completes the administrative tasks associated with providing a virtual call center (e.g., set up accounts, establish appropriate communication links and routing setup, etc.) at the time of the initial request and then proceeds to the process described with respect to FIG. 5.

Figure 5:
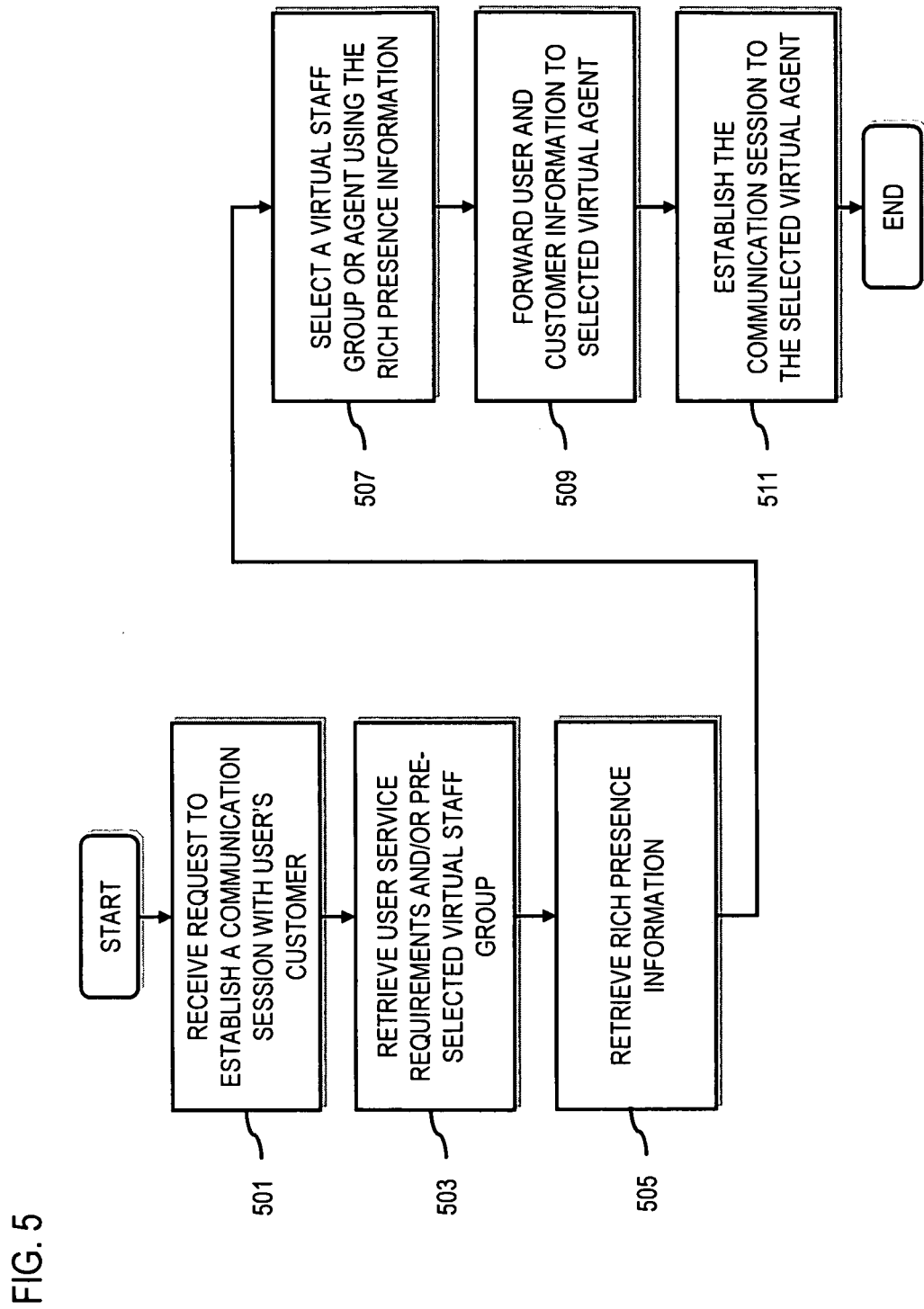
FIG. 5 is a flowchart of a process for using a virtual call center to respond to a customer communication, according to an exemplary embodiment.

FIG. 5 is a flowchart of a process for using a virtual call center to respond to a customer communication, according to an exemplary embodiment. In the example of FIG. 5, the virtual call center manager 109 has already established a virtual call center on behalf of a user 117 and is ready to route communications from the customers of user 117 to the appropriate virtual agent 111 for service. In step 501, the virtual call center manager 109 receives a request to establish a communication session with a customer of the user 117. In response, the virtual call center manager 109 retrieves the user's service requirements and determines whether one or more virtual staff groups 115 has been pre-selected to service the customers of the user 117 (step 503). The virtual call center manager 109 also retrieves the rich presence information of potential virtual staff groups 115 or agents 111 available to the virtual call center manager 109 (step 505). If one or more virtual staff groups 115 have been pre-selected, the virtual call center manager 109 can be configured to limit its retrieval of rich presence information to only those virtual agents 111 who are members of the pre-selected virtual staff groups 115.

In step 507, the virtual call center manager 109 evaluates the retrieved service requirements of the user 117 against the retrieved rich presence information to select a virtual staff group 115 or agent 111 to respond to the customer communication. In exemplary embodiments, the virtual call center manager 109 may use one or more of a number of algorithms for selecting a virtual staff group 115 or agent 111 using rich presence information. Exemplary selection algorithms are discussed with respect to FIGS. 6A-6D. Once a virtual agent 111 is selected, the virtual call center manager 109 forwards relevant information about the user 117 and/or the customer to the selected virtual agent 111 before connecting the selected virtual agent 111 with the customer (step 509). In this way, the virtual agent 111 has the information to provide, for instance, a branded greeting. In the example of the online florist, the virtual agent receives the user 117 information to greet the customer with "Online florist, how may I help you?" It is contemplated that the forwarded information may include other information such as previous contacts with the customer, customer location, customer order history, etc. to facilitate responding to the customer. After sending the information, the virtual call center manager 109 routes the customer communication to the selected virtual agent 111 (step 511)—i.e., initiate establishment of a communication session between the customer and the selected virtual agent 111. In exemplary embodiments, the type of communication session (e.g., voice, video, chat, instant messaging) is based on the communication capability of the virtual agent 111, the communication capability of the customer, the service requirements of the user 117, or any combination thereof. Communications between customers of user 117 and appropriate virtual agents 111 can be either inbound, where customer of user 117 contacts the virtual agent 111 (via virtual call center manager 109), or outbound, where virtual agent 111 contacts the customer of user 117 (via virtual call center manager 109).

FIGS. 6A-6D are flowcharts of algorithms for selecting a virtual staff group or agent using an availability threshold, classification of the customer communication, expected call volume, and staff effectiveness, respectively, according to various exemplary embodiments. In exemplary embodiments, the virtual call center manager 109 can be configured to use one or more of four different algorithms for selecting a virtual staff group 115 or agent 111. Process 600 of FIG. 6A uses a staff presence algorithm to determine the availability of a virtual staff group 115. In step 601, the virtual call center manager 109 defines one or more availability thresholds for a virtual staff group 115 or agent 111. Table 1 below presents exemplary classifications for assessing the availability of a virtual staff group 115. For example, if no virtual agent 111 is available to respond to the customer then the virtual staff group 115 is classified as "No Presence or Busy." If a single virtual agent 111 is available in a virtual staff group 115, the virtual staff group is classified as "Single Presence." The remaining three classifications (i.e., Low Level Presence, Medium Level Presence, and High Level Presence) are set by the user 117. For example, the user 117, as part of setting up the virtual call center, can define threshold levels for classifying a virtual staff group 115 as "Low Level Presence," "Medium Level Presence," or "High Level Presence." By way of example, Table 1 defines the thresholds on a percentage basis. In other embodiments, the user 117 may define the thresholds as an absolute number of virtual agents. The virtual call center manager 109 then uses rich presence information to classify the availability of a particular virtual staff group 115 or agent 111 (step 603). For instance, the virtual call center manager 109 when using process 600 may select a virtual staff group 115 or agent 111 that meet a specified availability threshold. The virtual call center manager 109 then routes the customer communication to the selected virtual staff group 115 or agent 111 (step 605), as to establish a communication session with the agent 111 (e.g., packetized voice call is routed to the agent 111).

TABLE 1

| Classification | Status | Criteria |
|---|---|---|
| No Presence or Busy | Not Available | No virtual agent available |
| Single Presence | Available | No more than 1 virtual agent available |
| Low Level Presence | Available | No more than $N_L$ % of virtual agents available, where $N_L$ defined by user; e.g., At least 5% virtual agents available |
| Medium Level Presence | Available | No more than $N_M$ % of virtual agents available, where $N_M$ defined by user; e.g., At least 50% virtual agents available |
| High Level Presence | Available | No more than $N_H$ % of virtual agents available, where $N_H$ defined by user; e.g., At least 85% virtual agents available |

Figure 6A:
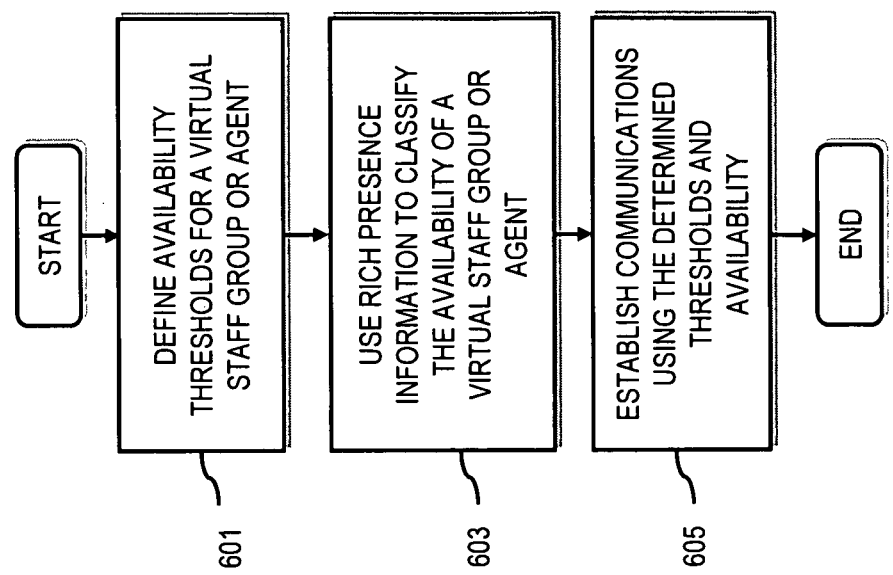
FIGS. 6A-6D are flowcharts of processes for selecting a virtual staff group or agent using an availability threshold, classification of the customer communication, expected call volume, and staff effectiveness, respectively, according to various exemplary embodiments.
Figure 6B:
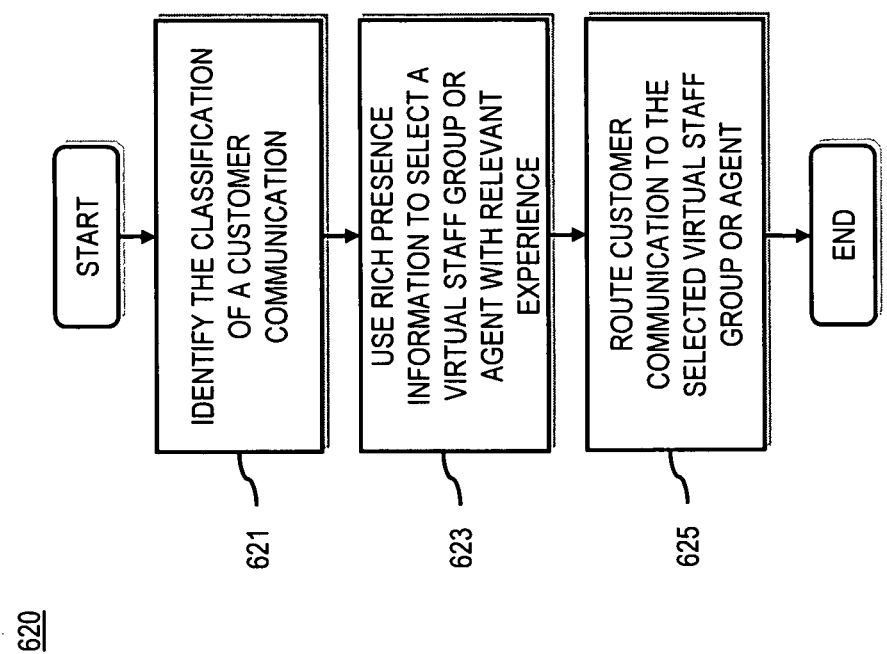

FIG. 6B depicts a process 620 for selecting a virtual staff group 115 or agent 111 using the classification of the customer communication, according to an exemplary embodiment. The process 620 is similar to the "sticky virtual staff group" approach previously described with respect to providing a virtual call center in FIG. 3. In the context of selecting a virtual staff group 115 and agent 111 for a customer, the sticky virtual staff group approach involves selecting the same virtual staff group 115 to respond to the same classification of customer inquiry. As used herein, the term "classification" of a customer inquiry refers to the subject matter, nature, and/or problem associated with a particular customer communication. In step 621, the virtual call center manager 109 when using the process 620, identifies the classification of a customer inquiry. For example, the classification may be self identified by a customer using an automated telephone response system. In other embodiments, the virtual call center manager 109 may analyze the customer communication to automatically identify the classification using, for instance, voice recognition. The virtual call center manager 109 can then use rich presence information to identify the group 115 or agents 111 with experience handling communications of the determined classification (step 623). In this way, the virtual staff group 115 or agent 111 with the most experience responding to a particular customer inquiry may be selected. The customer's communication is then routed to the selected virtual staff group 115 or agent 111 (step 625). In exemplary embodiments, information on the virtual staff group 115's and agent 111's experience with a particular inquiry is available in the rich presence information.

Figure 6C:
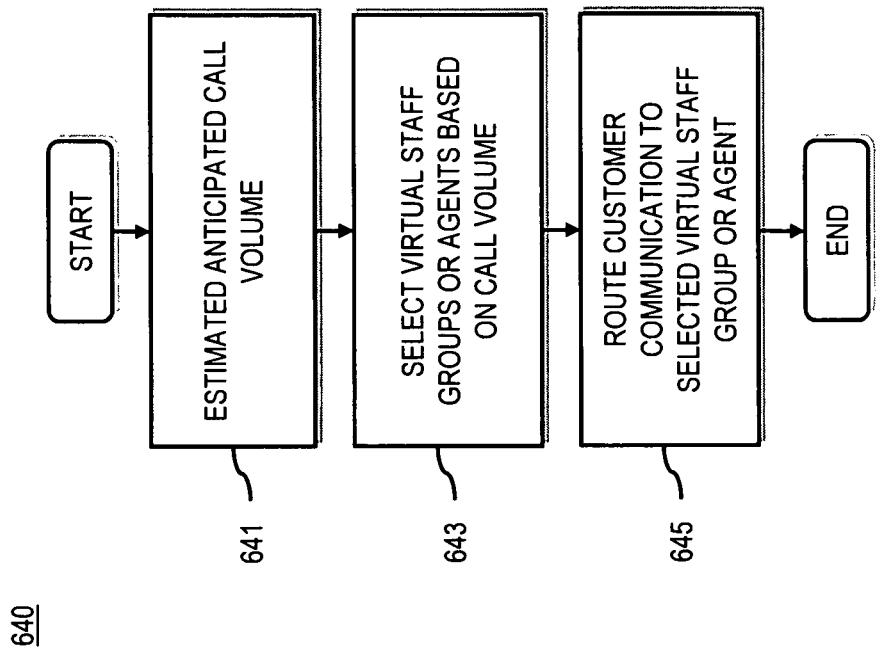

FIG. 6C depicts a process 640 for selecting a virtual staff group 115 or agent 111 using an expected volume of calls, according to an exemplary embodiment. Under certain situations, the user 117 or the virtual call center manager 109 when using process 640 can anticipate call volume based on, for instance, location, time-of-day, calendar, etc. (e.g., call volume increase before a holiday or new product roll-out in a geographic area) (step 641). In response, the process 640 directs the virtual call center manager to, for example, select virtual agents 111 based on their availability or other rich presence information during the period in which the call volume is expected (step 643). In addition, it is contemplated that the virtual call center 109 may select more than one virtual staff group 115 to assist in responding to the expected volume of calls. The virtual call center manager 109 then routes the customer communication to a virtual agent 111 able to respond during the period of the anticipated call volume (step 645).

Figure 6D:
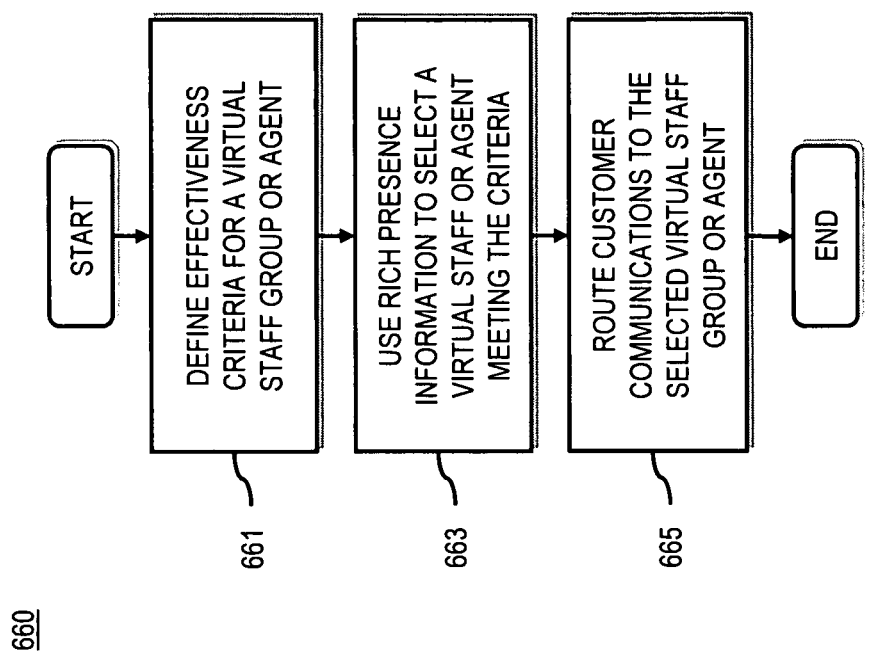

FIG. 6D depicts a process 660 for selecting a virtual staff group 115 or agent 111 using staff effectiveness criteria, according to an exemplary embodiment. In step 661, the virtual call center manager 109 defines staff effectiveness criteria for virtual staff groups 115 or agents 111. For example, the staff effectiveness criteria may include the average time that each virtual agent 111 within a particular virtual staff group 115 takes to resolve a customer's issue and/or the average customer satisfaction score for each virtual agent 111. It is contemplated that staff effectiveness criteria may be defined by the virtual call center manager 109 or the user 117. By way of example, under this approach, the virtual call center manager 109 stores performance information for each virtual agent 111 within each virtual staff group 115. In exemplary embodiments, the performance information is available in the rich presence information associated with each virtual agent 111. It is also contemplated that any other performance measure may be used in addition to or in place of the criteria discussed herein. The virtual call center manager 109 then selects a virtual staff group 115 or agent 111 to respond to the customer by evaluating whether the virtual staff group 115 or agent 111 meets the performance criteria (step 663). In certain embodiments, the algorithm may be configured to determine the best performing virtual staff group 115 or agent 111 to respond to a customer at a particular point in time. For example, the virtual call center manager selects the highest rated group 115 or agent 111 to respond. The virtual call center manager 109 then routes the customer communication to the selected virtual staff group 115 or agent 111 (step 665).

In certain embodiments, the use of the staff effectiveness process 660 may be limited to communications involving customers that have been designated as "high value" customers. For example, the virtual call center manager 109 and/or the user 117 may make the high value designation using any means (e.g., pre-shared high value customer list, special communication link (e.g., hot-line phone number), special flag, etc.). Under this approach, high value customers are routed to the best available agents 111 using staff effectiveness criteria.

It is contemplated that virtual call center manager 109 may use the processes 600-660 alone or in any combination.

The processes described herein for providing a virtual call center may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
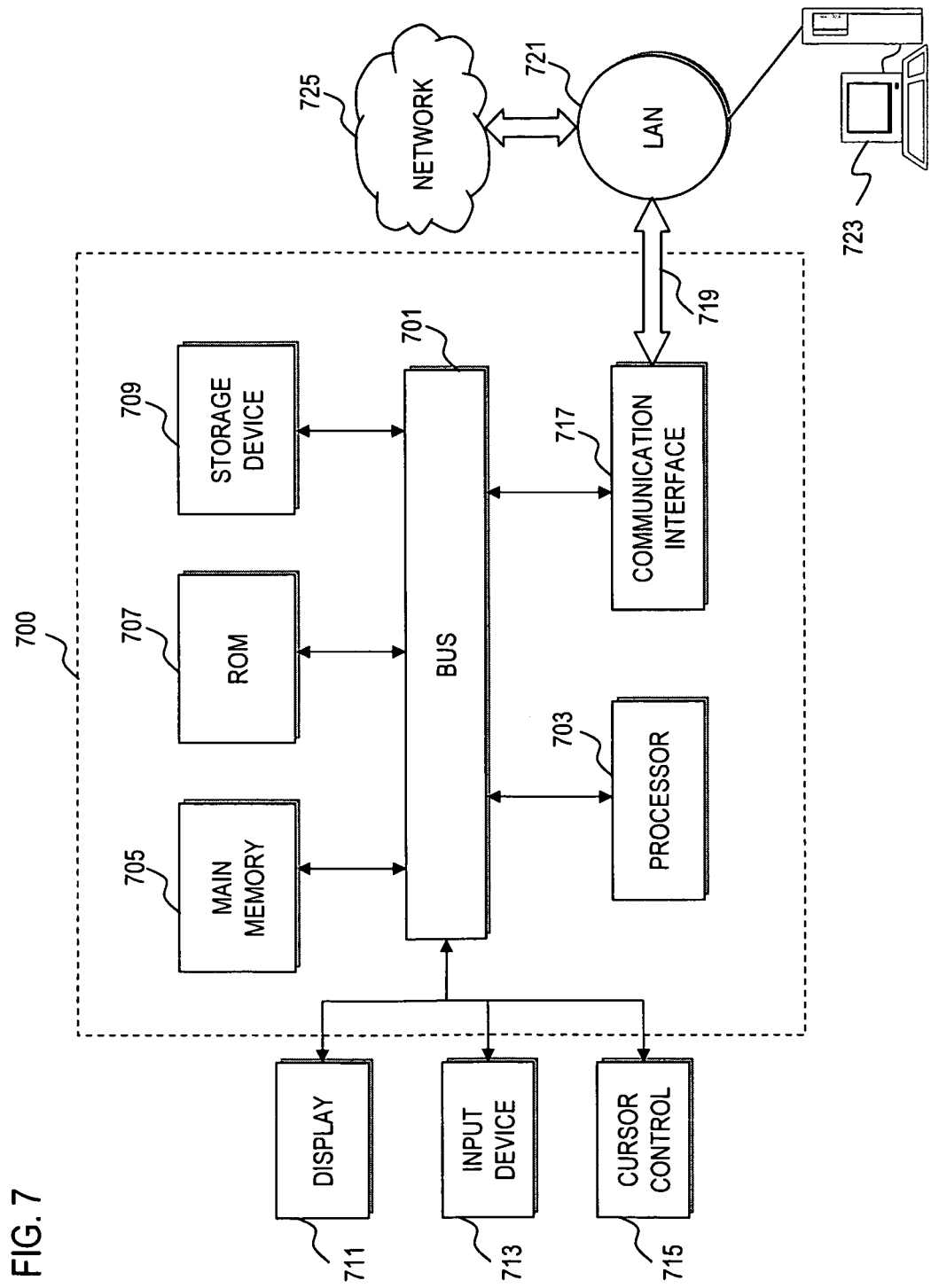
FIG. 7 is a diagram of a computer system that can be used to implement various exemplary embodiments.

FIG. 7 illustrates computing hardware (e.g., computer system) upon which an embodiment according to the invention can be implemented. The computer system 700 includes a bus 701 or other communication mechanism for communicating information and a processor 703 coupled to the bus 701 for processing information. The computer system 700 also includes main memory 705, such as random access memory (RAM) or other dynamic storage device, coupled to the bus 701 for storing information and instructions to be executed by the processor 703. Main memory 705 also can be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
receiving by a communication interface a request from a user to establish a service on behalf of the user;
determining by a processor one or more service requirements of the user for the service based on the request;
selecting by the processor a virtual agent among a plurality of virtual agents based on a customer of the user contacting the user and requesting the service, and rich presence information of the virtual agents; and
designating one or more virtual staff groups of a plurality of virtual agents based on the rich presence information of the virtual agents and the one or more service requirements,
wherein the selected virtual agent provides the service to the customer of the user on behalf of the user,
wherein the rich presence information, received from a rich presence server, includes physical location of the virtual agent with respect to a location at which the service is to be provided, ability of the virtual agent to travel to the location at which the service is to be provided, a skill set of the virtual agent, presence status of the virtual agent, calendar information of the virtual agent, and communication capability of the virtual agent,
wherein the skill set of the virtual agent includes one or more of technical capabilities of the virtual agent, language skills of the virtual agent, and experience with specific customers of the user,
wherein the one or more virtual staff groups are designated prior to the customer of the user contacting the user and requesting the service,
wherein the virtual agents within a virtual staff group share one or more characteristics defined by the rich presence information, and
wherein at least one of the one or more virtual staff groups is pre-selected to service the customer of the user requesting the service.

2. A method of claim 1, further comprising:
initiating establishment of a communication session related to the service between the customer of the user and the selected virtual agent; and
forwarding information corresponding to the user and the customer to the selected virtual agent prior to establishing the communication session between the customer and the selected virtual agent.

3. A method of claim 1, further comprising:
designating the one or more selected virtual staff groups to address subsequent service requests from customers of the user that are of identical classification to the received request.

4. A method of claim 1, further comprising:
determining a weighting of the one or more selected virtual staff groups,
wherein the selection of the virtual agent from the one or more selected virtual staff groups is further based on the weighting.

5. A method of claim 4, wherein the weighting is based on a percentage of available virtual agents within a virtual staff group; average service response time or customer satisfaction score of each virtual agent within a virtual staff group; and experience of each virtual agent within a virtual staff group in providing the service.

6. A method of claim 4, further comprising:
receiving a designation from the user that the customer is of high value;
selecting a best available virtual agent to service the high value customer based on the rich presence information of the virtual agents, the one or more service requirements, the weighting, or any combination thereof.

7. A method of claim 1, wherein the selection of the one or more virtual staff groups is further based on an expected volume of customer communications.

8. An apparatus comprising:
a communication interface configured to receive a request from a user to establish a service on behalf of the user; and
a virtual staff manager including a processor configured to determine one or more service requirement of the user for the service based on the request, to select a virtual agent among a plurality of virtual agents based a customer of the user contacting the user and requesting the service, and on rich presence information of the virtual agents, and to designate one or more virtual staff groups of a plurality of virtual agents based on the rich presence information of the virtual agents and the one or more service requirements,
wherein the selected virtual agent provides the service to a customer of the user on behalf of the user, and
wherein the rich presence information is received from a rich presence server and includes physical location of the virtual agent with respect to a location at which the service is to be provided, ability of the virtual agent to travel to the location at which the service is to be provided, a skill set of the virtual agent, presence status of the virtual agent, calendar information of the virtual agent, and communication capability of the virtual agent,
wherein the skill set of the virtual agent includes one or more of technical capabilities of the virtual agent, language skills of the virtual agent, and experience with specific customers of the user,
wherein the one or more virtual staff groups are designated prior to the customer of the user contacting the user and requesting the service,
wherein the virtual agents within a virtual staff group share one or more characteristics defined by the rich presence information, and
wherein at least one of the one or more virtual staff groups is pre-selected to service the customer of the user requesting the service.

9. An apparatus of claim 8, wherein the virtual staff manager is further configured to initiate establishment of a communication session related to the service between the customer of the user and the selected virtual agent, and to forward information corresponding to the user and the customer to the selected virtual agent prior to establishing the communication session between the customer and the selected virtual agent.

10. An apparatus of claim 8, wherein the virtual staff manager is further configured to designate the one or more selected virtual staff groups to address subsequent customer service and/or support requests from customers of the user that are of identical classification to the received request.

11. An apparatus of claim 8, wherein the virtual staff manager is further configured to determine a weighting of the one or more selected virtual staff groups, and
wherein the selection of the virtual agent from the one or more selected virtual staff groups is further based on the weighting.

12. An apparatus of claim 11, wherein the weighting is based on a percentage of available virtual agents within a virtual staff group; average service response time or customer satisfaction score of each virtual agent within a virtual staff group; and experience of each virtual agent within a virtual staff group in providing the service.

13. An apparatus of claim 11, wherein the virtual staff manager is further configured to receive a designation from the user that the customer is of high value, and to select a best available virtual agent to service the high value customer based on the rich presence information of the virtual agents, the one or more service requirements, the weighting, or any combination thereof.

14. An apparatus of claim 8, wherein the selection of the one or more virtual staff groups is based on an expected volume of customer communications.

* * * * *